United States Patent
Angermaier et al.

Patent Number: 5,433,107
Date of Patent: Jul. 18, 1995

[54] METHOD FOR RECOGNIZING ERRATIC COMBUSTION

[75] Inventors: Anton Angermaier, Landshut; Manfred Wier, Wenzenbach; Thomas Vogt, Regensburg, all of Germany

[73] Assignee: Siemens Aktiengesellschaft, Munich, Germany

[21] Appl. No.: 85,351

[22] Filed: Jun. 30, 1993

[30] Foreign Application Priority Data

Jun. 30, 1992 [EP] European Pat. Off. ............ 92111078

[51] Int. Cl.$^6$ ........................................... G01M 15/00
[52] U.S. Cl. .................................................. 73/117.3
[58] Field of Search ............................. 73/116, 117.3; 364/431.07, 431.08; 123/419, 436

[56] References Cited

U.S. PATENT DOCUMENTS

| | | | |
|---|---|---|---|
| 5,044,195 | 9/1991 | James | 73/117.3 |
| 5,088,318 | 2/1992 | Osawa | 73/117.3 |
| 5,241,480 | 8/1993 | Takaku et al. | 364/431.07 |

FOREIGN PATENT DOCUMENTS

4009285 12/1990 Germany.
4001333 10/1991 Germany.
9209875 6/1992 WIPO.

OTHER PUBLICATIONS

"Methods of On–Board Misfire Detection", Plapp et al., SAE Technical Paper, pp. 9–20.

*Primary Examiner*—Robert Raevis
*Attorney, Agent, or Firm*—Herbert L. Lerner; Laurence A. Greenberg

[57] ABSTRACT

A method is provided for recognizing erratic combustion in a multicylinder internal combustion engine by using a time measuring device to measure successive time periods which a crankshaft needs to rotate through predetermined angles during operating strokes of successive cylinders. The method includes determining a static component by using a calculating device to subtract a time period of the next cylinder in an ignition order from the time period of a cylinder to be examined. The static component is multiplied with a standardizing factor by using the calculating device. A dynamic component is determined by using the calculating device to subtract a time period of a next cylinder in the ignition order from a time period of a preceding cylinder in the ignition order, and a dynamic component is negated. A change component for a lack of smoothness value is formed, the lack of smoothness value is multiplied with a weighting factor to form a weighted value, and the weighted value is set equal to zero if the weighted value is negative. A sliding average is formed from the weighted value in a sliding averaging process. A lack of smoothness value is determined from addition of the static component, the dynamic component, and the sliding average. A combustion misfire is recognized if the smoothness value falls below a given limit value.

7 Claims, 2 Drawing Sheets

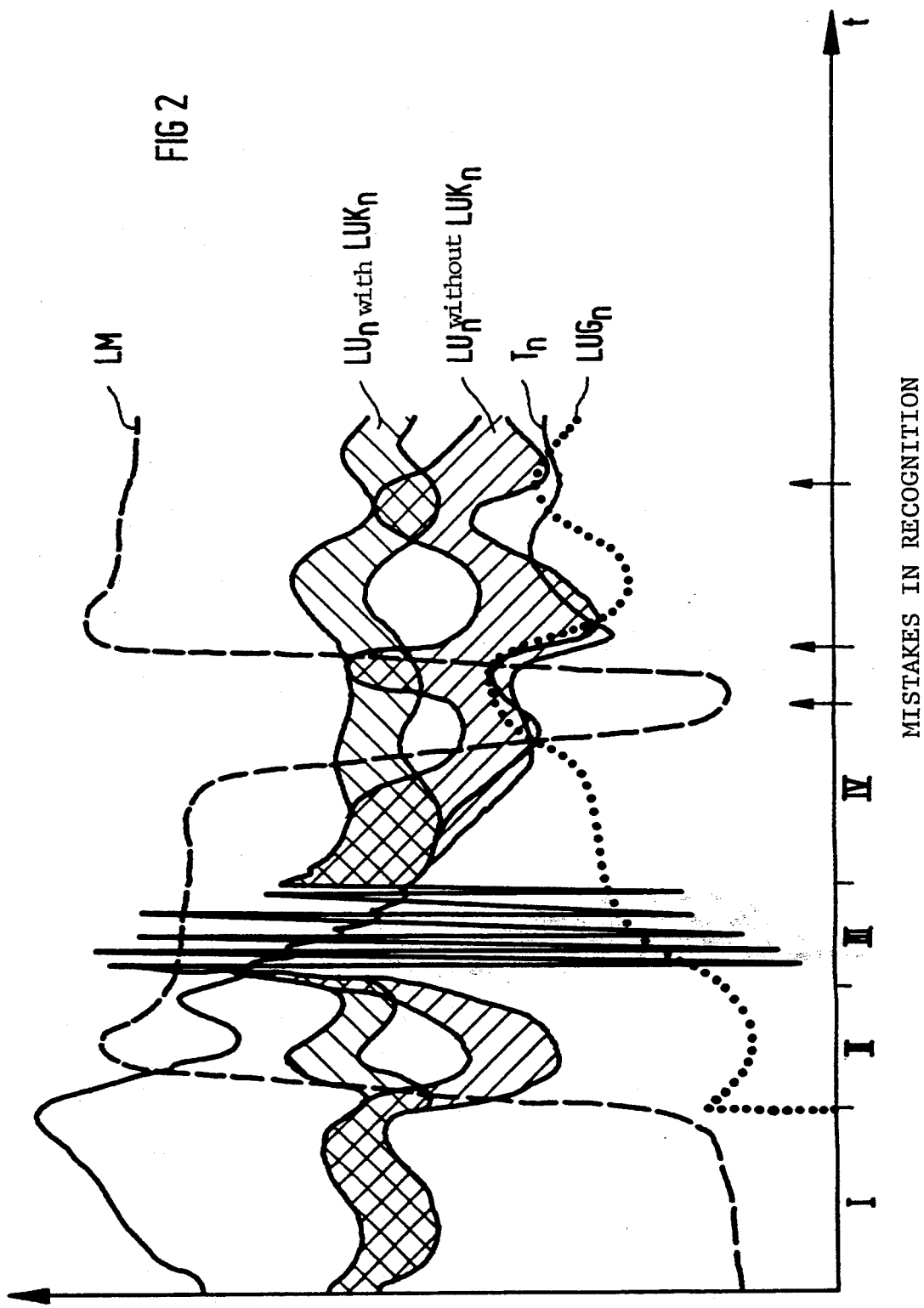

METHOD FOR RECOGNIZING ERRATIC COMBUSTION

BACKGROUND OF THE INVENTION

1. Field of the Invention

The invention relates to a method for recognizing erratic combustion in multicylinder internal combustion engines. In engines equipped with a catalytic converter, erratic combustion can cause damage to the catalytic converter, since after-reactions of the uncombusted mixture of fuel and air can cause high temperatures in the catalytic converter. Regardless of whether or not a catalytic converter is used, erratic combustion causes poorer-quality exhaust.

Methods are already known that measure the instantaneous angular speed of the crankshaft in order to detect erratic combustion. The period of time during which the crankshaft rotates about a defined angle is measured. The time measurement is typically carried out with the aid of markings on a wheel mounted on a crankshaft. The difference between successive periods of time that are measured is compared with the limit value. Erratic combustion leads to a temporary slowing of the angular speed of the crankshaft, since the energy that would be contributed by the misfiring cylinder is missing in the drive of the crankshaft. If the angular speed slows down, the difference between successive measured time periods increases. If a predeterminable limit value is exceeded, an ignition misfire is recognized and indicated or displayed. Control provisions can then optionally be made, with one example being to turn off the applicable injection nozzle.

A primary disadvantage of the known methods is that they are suitable only for steady-state operation at a constant speed, without braking and acceleration. In braking, for instance, the angular speed of the crankshaft decreases. The measured time period and the difference between successive time periods become greater, and as soon as that increase in the time period exceeds a limit value, a combustion misfire is indicated. Yet no misfire has in fact yet occurred, rather simply entirely normal braking took place. German Published, Non-Prosecuted Application DE 40 09 895 A1 describes a method that overcomes that disadvantage.

In the method described in German Published, Non-Prosecuted Application DE 40 09 895 A1, not only a static component but also a dynamic component is calculated, which takes into account the mean linear increase in speed (acceleration) or the mean linear decrease in speed (deceleration). The dynamic component is calculated so that periods of time of a plurality of cylinders that are successive, but spaced farther apart timewise, are compared with one another. If the dynamic component is then subtracted from the static component, that compensates for the influence of changes in speed on the measured time periods. The remaining changes in the time periods are then in fact predominantly due to erratic combustion.

A disadvantage of the method described above is that once again it is unsuitable for a markedly unsteady-state operation, because it can compensate only for the influences of constant acceleration or constant deceleration. Yet those driving states tend to be the exception in everyday operation of a motor vehicle. Under everyday conditions, usually highly unsteady conditions prevail instead, with examples being uneven deceleration, uneven acceleration, an often abrupt change back and forth between acceleration and deceleration, or even very hard changes in speed, such as in fast clutch engagement and disengagement.

SUMMARY OF THE INVENTION

It is accordingly an object of the invention to provide a method for recognizing erratic combustion, which overcomes the hereinafore-mentioned disadvantages of the heretofore-known methods of this general type and in which reliable erratic combustion recognition is possible even in such highly unsteady operating states.

With the foregoing and other objects in view there is provided, in accordance with the invention, a method for recognizing erratic combustion in a multicylinder internal combustion engine by using a time measuring device to measure successive time periods which a crankshaft needs to rotate through predetermined angles during operating strokes of successive cylinders, which comprises determining a static component by using a calculating device to subtract a time period of the next cylinder in an ignition order from the time period of a cylinder to be examined; multiplying the static component with a standardizing factor by using the calculating device; determining a dynamic component by using the calculating device to subtract a time period of a next cylinder in the ignition order from a time period of a preceding cylinder in the ignition order, and negating a dynamic component; forming a change component for a lack of smoothness value, multiplying the lack of smoothness value with a weighting factor to form a weighted value, and setting the weighted value equal to zero if the weighted value is negative; forming a sliding average from the weighted value in a sliding averaging process; determining a lack of smoothness value from addition of the static component, the dynamic component, and the sliding average; and recognizing a combustion misfire if the smoothness value falls below a given limit value.

In accordance with another mode of the invention, there is provided a method which comprises taking the limit values from performance curves determined as a function of load, rpm, and temperature of the engine.

In accordance with a further mode of the invention, there is provided a method which comprises reading out performance values from the performance curves, buffer storing the performance values in a buffer store, and comparing lack of smoothness values and limit values for lack of smoothness for the same time periods.

In accordance with an added mode of the invention, there is provided a method which comprises performing a sliding averaging process on the smoothness value $GLUK_n$ according to the equation $GLUK_n = GLUK_{n-1}*(1-MITKO)+LUK_n*MITKO$, wherein MITKO is an averaging constant having a range of values between 0 and 1, and $LUK_n$ is the lack of smoothness value.

In accordance with an additional mode of the invention, there is provided a method which comprises calculating the standardizing factor NO of the static component as a function of a measuring window $n-x$ through $n+y$ of the dynamic component by the formula $NO = x+y$.

In accordance with yet another mode of the invention, there is provided a method which comprises selecting the measuring window for computing the dynamic component and the change component such that for given cylinders, the time period of the same mechanical segment of the crankshaft is measured.

In accordance with a concomitant mode of the invention, there is provided a method which comprises selecting the angular range of the crankshaft over which the time periods are measured, such that with respect to the top dead center of the motion of a respective piston, at an unfavorable operating point, it furnishes a maximum signal rise in the event of erratic combustion.

Besides the above-described static component and the dynamic component that takes into account the general rpm trend, the method of the invention additionally includes a so-called change component, with which changes in acceleration and deceleration can be taken into account. In order to calculate this change component, instead of comparing the difference between the time periods of directly successive cylinders with one another, the difference in the time periods of cylinders that are farther apart is compared instead. The value obtained thereby is additionally weighted and enters the method of the invention only in the form of a sliding averaging process.

Other features which are considered as characteristic for the invention are set forth in the appended claims. Although the invention is illustrated and described herein as embodied in a method for recognizing erratic combustion, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is an illustration of a simulation of a highly unsteady driving operation with five combustion misfires.

DESCRIPTION OF THE PREFERRED EMBODIMENTS

Figure 1:
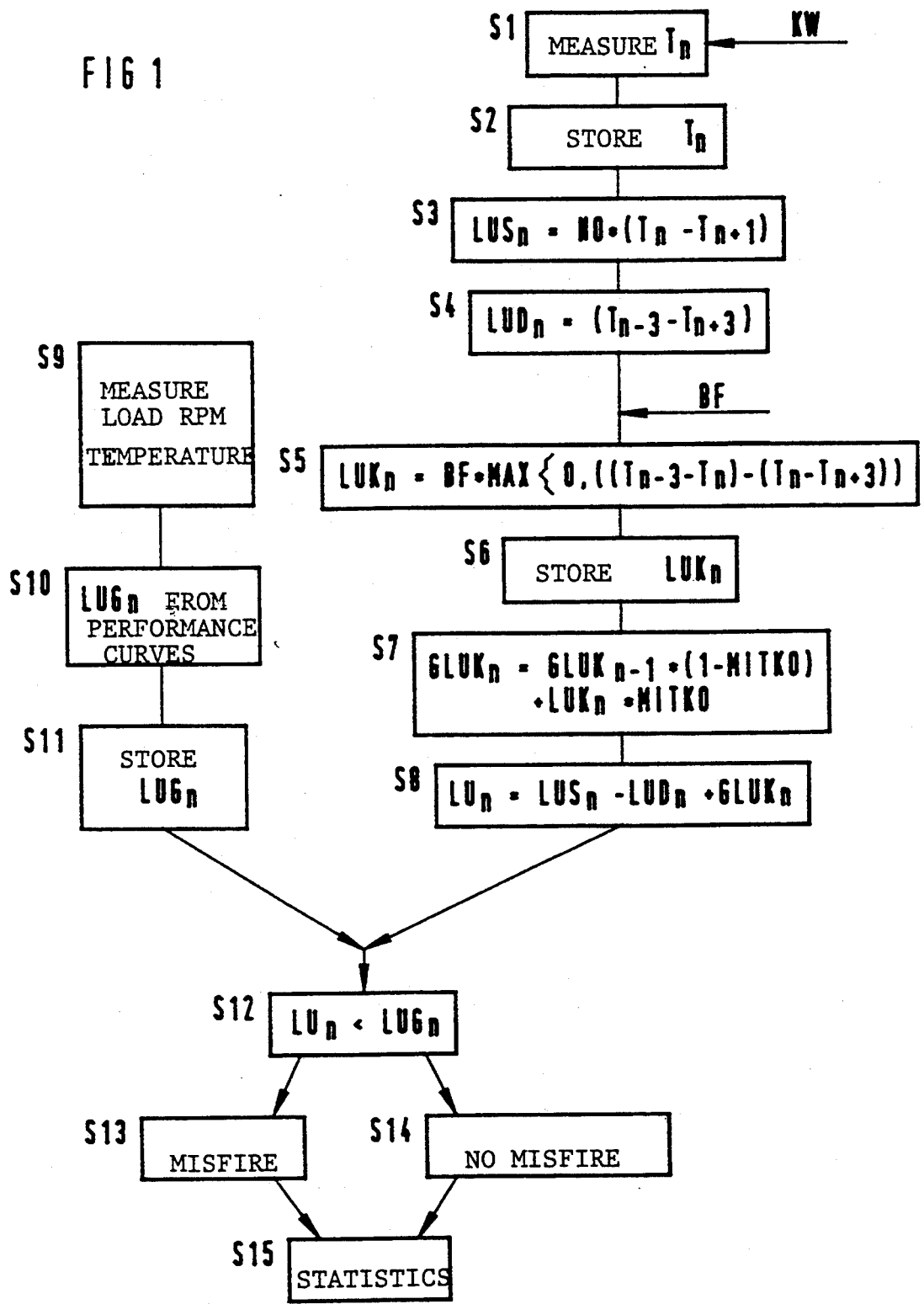
FIG. 1 is a flow diagram illustrating method steps of an exemplary embodiment of a method according to the invention.

Referring now to the figures of the drawing in detail and first, particularly, to FIG. 1 thereof, there is seen an illustration of a method according to the invention, taking a six-cylinder engine as an example.

In a method step S1, using markings on a crankshaft, time periods $T_n$ that the crankshaft needs to rotate about a certain crankshaft angle, in this case 120°, for instance, during the working stroke of a cylinder, are measured with a time measuring device.

The continuously measured values are buffer-stored in a method step S2.

In a method step S3, a static component $LUS_n$ is calculated with a calculating device, in each case from two successive time periods $T_n$, $T_{n+1}$.

A standardizing factor NO used in the method step S3 is dependent on a measuring window (n−x through n+y), which is used in a method step S4 for calculating a dynamic component. This is calculated from an equation NO=x+y, or in other words in this exemplary embodiment NO=3+3=6.

In the method step S4, the dynamic component $LUD_n$ is calculated by forming a difference between the farther-apart time periods. In this exemplary embodiment, the third-from-last time period $T_{n-3}$ or the third time period $T_{n+3}$ from then, with respect to the current time period $T_n$, is used. It would also be possible in this case to use an asymmetrically placed measuring window with respect to the current time period $T_n$. The dynamic component $LUD_n$ is then negated.

In a method step S5, a change component $LUK_n$ is calculated. Two differential values are formed symmetrically to the current time period $T_n$. In the exemplary embodiment, these are $T_{n-3}-T_n$ and $T_n-T_{n+3}$. From these two values, a difference is again formed, and that difference, if it is greater than 0, is weighted by a weighting factor BF. If this difference is less than 0, it set to zero.

The thus-calculated change component $LUK_n$ is stored in a buffer store in a method step S6, and then in a method step S7 is used to determine a sliding average, for instance by the following formula:

$$GLUK_n = GLUK_{n-1}*(1-MITKO) + LUK_n*MITKO,$$

where MITKO is an averaging constant with a range of values between 0 and 1.

Measuring windows (n, n−x, n+y, n−z, n+z) in the calculation of the dynamic component and the change component are advantageously selected in such a way that at the corresponding cylinders n, n−x, n+y, n−z, n+z, the time period of the same mechanical segment of the crankshaft is measured. Any inequality in the size of the individual crankshaft segments that may be present will therefore not cause any measurement error.

Advantageously, the angular span of the crankshaft over which the time periods are measured is selected, with respect to top dead center of the motion of the associated piston, in such a way that they span the range of maximum signal rise. A combustion misfire thus exhibits more-pronounced effects. Since these angle ranges are load and rpm-dependent, this optimization is performed at the least favorable operating point (high rpm and low load), so that even in this range, an adequately great signal rise will still be present.

From these individual components, in a method step S8 a value for the lack of smoothness is formed for the period of time $T_n$ observed, by means of adding together the individual components $LUS_n$ and $GLUK_n$, and the previously negativated $LUD_n$.

In a method step S9, simultaneously with the time period $T_n$, the load, rpm and temperature of the engine were measured. In accordance with these characteristic variables, in a method step S10, a limit value for lack of smoothness $LUG_n$ was taken from associated performance graphs and buffer-stored in a method step S11.

By buffer-storing the values, it is then possible in a method step S12 to compare the limit value for lack of smoothness $LUG_n$ in the time period $T_n$ with a value $LU_n$ for lack of smoothness calculated for the same period of time.

If the lack of smoothness value $LU_n$ is less than the limit value of lack of smoothness $LUG_n$, then in a method step S13 a combustion misfire is recorded. If $LU_n$ is greater than or equal to $LUG_n$, no misfire is recorded (in a method step S14). Both cases are delivered for statistical evaluation in a method step S15, since when individual combustion misfires are recognized it is not yet possible to take controlling actions, such as shutting off injection nozzles. Such actions cannot be taken until the statistical frequency of such combustion misfires exceeds a certain limit.

FIG. 2 shows curves plotted over time for a highly unsteady-state driving mode, of the following measured variables: air mass LM, time period $T_n$ of crankshaft revolution, and the lack of smoothness value $LU_n$ calculated for it (with and without a change component $LUK_n$). Additionally shown is the limit value for lack of smoothness $LUG_n$, which is taken as a function of operating variables from the performance graphs.

A distinction can be made between chronologically different operating ranges. In a range I, an overrunning shutoff prevails. The fuel injection has been shutoff, and no erratic combustion recognition takes place.

In a range II, the driver has depressed the gas pedal at high speed, causing an expulsion of air, which is apparent from a sharp rise and an overswing at the top in the LM curve shown in dashed lines. The rpm increases with corresponding fluctuations and the measured time periods $T_n$ of the crankshaft revolutions become shorter, which can be seen from a drop in the $T_n$ curve shown in solid lines.

Two shaded curve bands represent the calculated lack of smoothness value $LU_n$. This value fluctuates within the boundaries of the scattering bands that are shown.

In order to provide comparison, the lack of smoothness value without the change component $LUK_n$ is shown (the lower curve with shading diagonally downward toward the left), as is the lack of smoothness value with the change component (the curve nearer the top with shading diagonally downward toward the right). The areas of overlap are apparent from the cross-hatching. The two curves for the lack of smoothness value deviate from one another in the range II. However, both curves still remain above the limit value for the lack of smoothness $LUG_n$ (lower doted line), which is taken from performance graphs. In other words, no mistakes in recognition are tripped by this unsteady operating range. The upper curve, that is the curve of the lack of smoothness value with the change component, maintains a greater signal-to-noise interval from the curve of the limit value of the lack of smoothness $LUG_n$ than the lower curve, that is the curve for the lack of smoothness value without the change component. This greater signal-to-noise interval aids in increasing the certainty with which mistakes in recognition can be precluded.

In the next range, a range III, five combustion misfires are produced. Both curves of the lack of smoothness value assume such major fluctuations that they drop below the curve of the limit value $LUG_n$, whereupon these five combustion misfires are recognized. This occurs as highly unsteady-state operation continues, which can be seen from the dropping curve of the time periods $T_n$. This curve also has small zig-zags upward, which are a clear sign that the combustion misfires are causing a brief slowing down of the angular speed of the crankshaft and therefore a prolongation of the time periods $T_n$.

A following range IV again exhibits a highly unsteady operating range. It is characterized by an abrupt letup on the gas and a following, equally sudden, depression of the gas pedal again. This can be seen from the sharp break in the air mass curve LM. The curve for the time periods $T_n$ also decreases in the presence of major fluctuations. The two lack of smoothness curves LU again deviate from one another. The lower curve, that is the curve of the lack of smoothness value without the change component $LUK_n$, drops repeatedly below the curve of the limit value $LUG_n$. Each time it drops below this curve, a combustion misfire is mistakenly recognized. Conversely, if in this range one looks at the upper lack of smoothness curve, in which the change component $LUK_n$ is also taken into account, then it becomes clear that this curve, because it extends farther upward, does not drop below the curve of the limit value of the lack of smoothness $LUG_n$. Mistakes in recognition are thus reliably avoided, even in this highly unsteady operating state.

We claim:

1. A method for recognizing erratic combustion in a multicylinder internal combustion engine by using a time measuring device to measure successive time periods which a crankshaft needs to rotate through predetermined angles during operating strokes of successive cylinders, which comprises:

(a) determining a static component by using a calculating device to subtract a time period of the next cylinder in an ignition order from the time period of a cylinder to be examined;

(b) multiplying the static component with a standardizing factor by using the calculating device;

(c) determining a dynamic component by using the calculating device to subtract a time period of a next cylinder in the ignition order from a time period of a preceding cylinder in the ignition order, and negating the determined dynamic component;

(d) forming a change component by calculating a value $(T_{n-z}-T_n)-(T_n-T_{n+z})$, where T is a time period, n is an index indicating a cylinder, and z is an integer, and multiplying the value with a weighting factor, wherein the change component is set equal to zero if the change component is negative; and wherein a sliding average is formed of the change component;

(e) determining a lack of smoothness value from addition of the static component, the dynamic component, and the sliding average; and (f) recognizing a combustion misfire if the smoothness value falls below a given limit value.

2. The method according to claim 1, which comprises taking given limit value from performance curves determined as a function of load, rpm, and temperature of the engine.

3. The method according to claim 2, which comprises reading out performance values from the performance curves, buffer storing the performance values in a buffer store, and comparing lack of smoothness values and limit values for lack of smoothness for the same time periods.

4. The method according to claim 1, which comprises performing a sliding averaging process on the smoothness value $GLUK_n$ according to the equation:

$$GLUK_n = GLUK_{n-1}*(1-MITKO) + LUK_n*MITKO,$$

wherein MITKO is an averaging constant having a range of values between 0 and 1, and $LUK_n$ is the lack of smoothness value.

5. The method according to claim 1, which comprises calculating the standardizing factor NO of the static component as a function of a measuring window $n-x$ through n+y of the dynamic component by the formula $NO=x+y$.

6. The method according to claim 5, which comprises selecting the measuring window for computing the dynamic component and the change component such that for given cylinders, the time period of the same mechanical segment of the crankshaft is measured.

7. The method according to claim 6, which comprises selecting the angular range of the crankshaft over which the time periods are measured, such that with respect to the top dead center of the motion of a respective piston, at an unfavorable operating point, it furnishes a maximum signal rise in the event of erratic combustion.

* * * * *